(12) United States Patent
Miyahara

(10) Patent No.: US 6,704,649 B2
(45) Date of Patent: Mar. 9, 2004

(54) SATELLITE NAVIGATION SYSTEM OF WHICH MAP DATA ARE PARTIALLY UPDATEABLE

(75) Inventor: Hiroshi Miyahara, Tokyo-to (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 0 days.

(21) Appl. No.: 10/202,064

(22) Filed: Jul. 25, 2002

(65) Prior Publication Data

US 2003/0028315 A1 Feb. 6, 2003

(30) Foreign Application Priority Data

Jul. 31, 2001 (JP) ..................... P2001-232553

(51) Int. Cl.⁷ ............................. G01C 21/30
(52) U.S. Cl. ................. 701/208; 701/200; 701/207; 701/214; 340/990; 340/995
(58) Field of Search ................. 701/208, 200, 701/201, 207, 210, 213, 214; 707/10; 340/990, 995

(56) References Cited

U.S. PATENT DOCUMENTS 6,292,745 B1 * 9/2001 Robare et al. ............... 701/208
6,507,850 B1 * 1/2003 Livshutz et al. ......... 707/104.1
2002/0169778 A1 * 11/2002 Natesan et al. ............... 707/10

* cited by examiner

Primary Examiner—Marthe Y. Marc-Coleman
(74) Attorney, Agent, or Firm—Nixon & Vanderhye PC

(57) ABSTRACT

In a satellite navigation system, map data stored in a server is partially updateable. The map data is produced to be divided into a plurality of sets of map data mutually-independent set by set, and stored in the server. The map data is updated every set of the divided map data, according to necessities. Such update operations are addition of a new set of map data, deletion of a certain set of map data, and replacement of a certain set of map data with a new set of map data. The map data is formed into a layered structure composed of data of layers, blocks, and objects. For reloading the map data, it is sufficient that only one or more sets of map data that has been updated are delivered from the server to each terminal. Hence an amount of map data to be downloaded can be reduced.

9 Claims, 6 Drawing Sheets

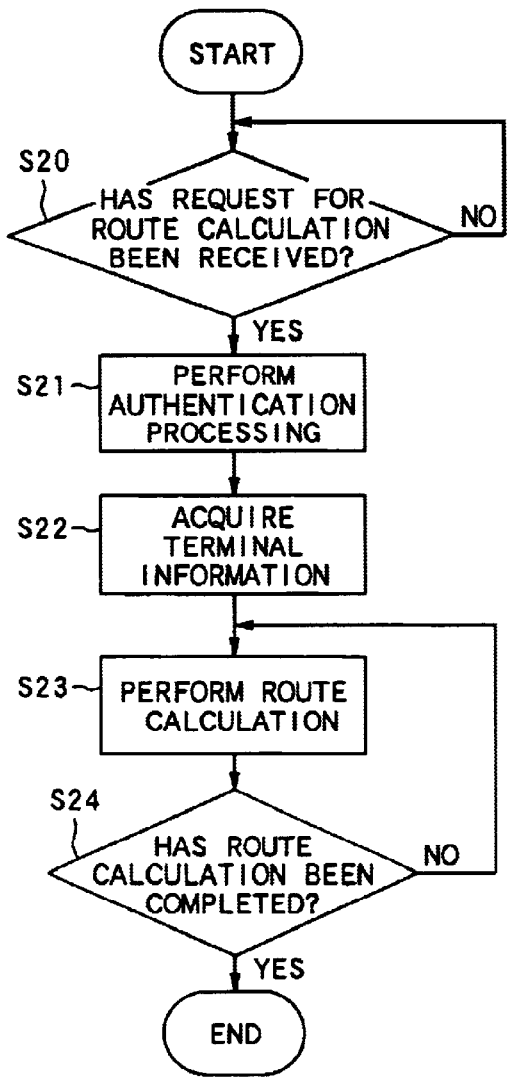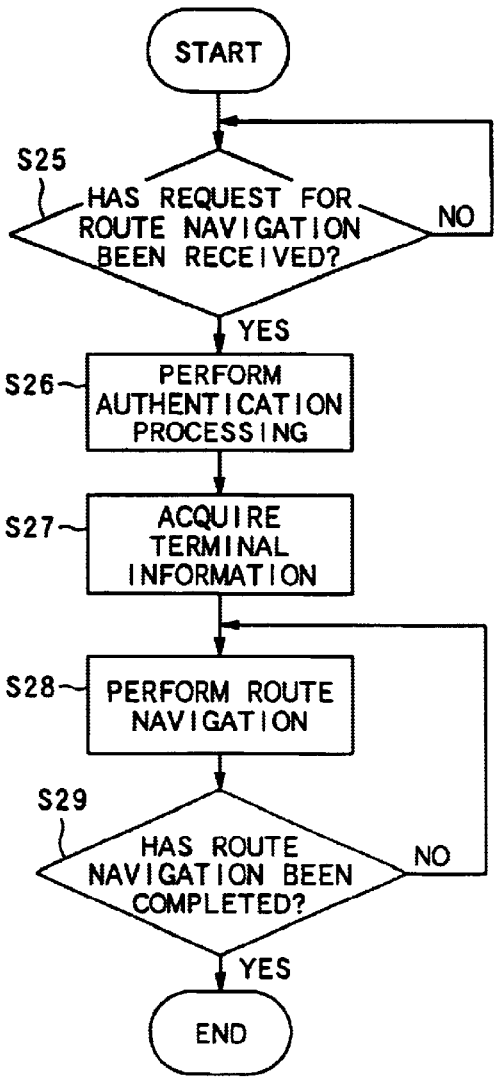
FIG. 3A
FIG. 3B

SATELLITE NAVIGATION SYSTEM OF WHICH MAP DATA ARE PARTIALLY UPDATEABLE

BACKGROUND OF THE INVENTION

1. Field of the Invention

The present invention relates to a satellite navigation system comprising a server and on-vehicle navigating terminals communicably connected to the server via a communication network, wherein map data supplied to the navigating terminals are partially updateable.

2. Description of Related Art

In recent years, a satellite navigation system has become popular. The satellite navigation system guides a user (driver) to a user's desired destination with a map shown on a navigating terminal. A practical configuration of such satellite navigation system is configured as now described. In response to a user's request, map data stored in a server placed at a map data base site are transmitted to such a navigating terminal as an on-vehicle navigation unit, mobile navigation unit, PDA (personal digital assistants), or mobile phone, through communication means. The communication means is composed of for example a computer network (e.g., the Internet) or a mobile communication network. The navigating terminal includes a GPS (global-positioning system) to detect a vehicle's current position, and provides a map on a monitor thereof using both the vehicle's current position and the received map data.

Such a satellite navigation system is advantageous in that it is able to enable each navigating terminal (i.e., a user) to make reference to the newest versions of maps. In order to gain the advantage, a user has to have the newest map data by reloading map data stored in a memory block in the navigating terminal, whatever the map data handled in the server is updated.

On the other hand, in each navigating terminal participating in the satellite navigation system, a unit of map data accumulated in the navigating terminal is marked, area by area, by points to relate them to each other.

However, in the conventional satellite navigation system, it is difficult to alter or modify only partial map data (for example, only data of a background or a road) when the map data is updated, because the unit of map data is marked area by area by points. Even when some notes (for example, characters or symbols) are update alone, the entire unit of the map data must be reloaded. Accordingly, processing to replace the old map data with new one is required in the navigating terminal. Thus, amounts of data to be reloaded become extremely large, resulting in a longer time for data processing in the reloading and a higher cost of the reloading.

To make matters worse, this reloading might have influence on the surrounding unit coupled with the map data unit or superior or inferior units to the map data unit. Such a case becomes an obstacle to smooth and steady operations for navigation.

SUMMARY OF THE INVENTION

The present invention has been made in view of the above circumstances. An object of the present invention is, therefore, to greatly reduce an amount of data to be re-loaded when map data is updated.

The present invention is reduced into practice in various aspects, such as a server incorporated in a satellite navigation system and a method of updating map data in the satellite navigation system.

In order to achieve the above object, as one aspect of the present invention, there is provided a method of updating map data in a satellite navigation system comprising a server storing map data to be displayed on a terminal; the method comprising the steps of: producing the map data divided into a plurality of sets of map data that are mutually-independent set by set, the divided map data being stored in the server; and updating, every set of the divided map data, the map data stored in the server.

As a result, in the server, the map data can be replaceable partially, that is, every set of divided data map, in an easier manner. This partially replaceable configuration is also effective in reloading map data from the server to each navigating terminal. For reloading the map data, it is sufficient that only one or more sets of map data that has been updated are delivered from the server to the navigating terminal. Hence an amount of map data to be downloaded can be reduced greatly.

Further, because the map data are divided into a plurality of sets independent of each other, each certain set of map data can be replaceable with no effect on the other sets of map data in terms of data connections.

Preferably, the updating step is one selected from a group of processes including a step of adding a new set of map data to the map data, a step of deleting a certain set of map data from the plurality of sets of map data, and a step of replacing a certain set of map data of the plurality of sets of map data with a new set of map data. By way of example, the map data consists of different kinds of map data formed into a layered structure of map data.

It is also preferred that the layered structure of map data includes a first layer formed by data of a plurality of objects, a second layer formed by a plurality of blocks, each block consisting of one or more objects of the same kind, and a third layer formed by a plurality of layers, each layer consisting of data of a plurality of blocks for the same type of depiction of map data. By way of example, each set of the map data is composed of one of each layer of map data, each block of map data, and each object of map data.

In order to accomplish the foregoing object, as another aspect of the present invention, there is provided a server for storing map data to be displayed on a terminal, both of the server and the terminal being incorporated in a satellite navigation system, the server comprising: a storage for storing the map data divided into a plurality of sets of map data that are mutually-independent set by set, the divided map data being stored in the server; and an updating unit configured to update, every set of the divided map data, the map data stored in the server.

Accordingly, this configuration also provides the same advantages as those explained above. That is, because the map data can be replaceable partially in the server, it is sufficient that only one or more sets of map data that has been updated are delivered from the server to the navigating terminal in reloading the map data. Hence an amount of map data to be downloaded can be reduced greatly. Further, the map data are divided into a plurality of sets independent of each other, so that each certain set of map data can be replaceable with no affection for the other sets of map data in terms of data connections.

In the above second configuration, it is preferred that wherein the updating unit is configured to perform one selected from a group of processes including adding a new set of map data to the map data, deleting a certain set of map data from the plurality of sets of map data, and replacing a certain set of map data of the plurality of sets of map data with a new set of map data. By way of example, the map data consists of different kinds of map data formed into a layered structure of map data.

It is also preferred that the layered structure of map data includes a first layer formed by data of a plurality of objects, a second layer formed by a plurality of blocks, each block consisting of one or more objects of the same kind, and a third layer formed by a plurality of layers, each layer consisting of data of a plurality of blocks for the same type of depiction of map data. Preferably, each set of the map data is composed of one of each layer of map data, each block of map data, and each object of map data.

According to another aspect of the present invention, there is provided a recording medium for storing map data, which is incorporated in a server of a satellite navigation system, the map data being divided into a plurality of sets of map data that are mutually-independent set by set, updateable every set of the divided map data, and configured to have different kinds of map data formed into a layered structure of map data, wherein the layered structure of map data includes a first layer formed by data of a plurality of objects, a second layer formed by a plurality of blocks, each block consisting of one or more objects of the same kind, and a third layer formed by a plurality of layers, each layer consisting of data of a plurality of blocks for the same type of depiction of map data.

BRIEF DESCRIPTION OF THE DRAWINGS

Other objects and aspects of the present invention will become apparent from the following description and embodiments with reference to the accompanying drawings in which:

FIG. 3A is a flowchart showing processing for computing a desired route, which is carried out as part of route processing according to the embodiment;

FIG. 3B is a flowchart showing processing for guiding the route, which is carried out as part of route processing according to the embodiment;

DETAILED DESCRIPTION OF THE PREFERRED EMBODIMENT

A preferred embodiment according to the present invention will now be described with reference to accompanying drawings.

In the following embodiment, a satellite navigation system to which the present invention is applied will now be described. The satellite navigation system includes on-vehicle terminals, a server, and a network such as the Internet connecting the server to the terminals, in which both of the terminals and the server are able to communicate to each other through the network. The satellite navigation system is able to give guide information to a user on a vehicle on which each terminal is mounted.

(I) Entire configuration and its operations

First, referring to FIGS. 1A to 1C, to 4, the entire configuration and its operations of a navigation system according to the present embodiment.

Figure 1A:
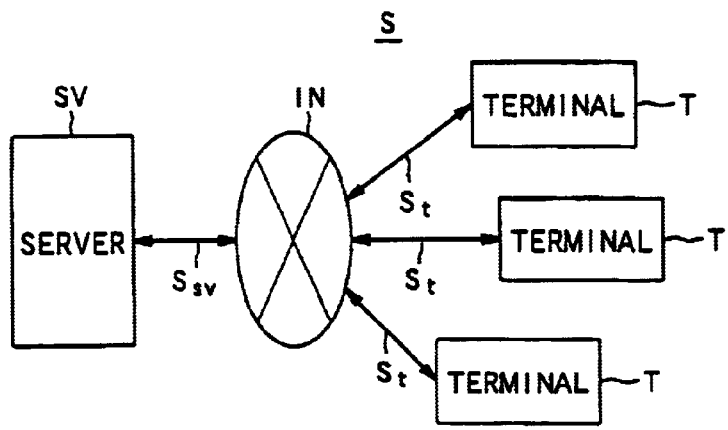
FIG. 1A shows the entire block diagram of a navigation system according to an embodiment of the present invention.
Figures 1B, 1C:
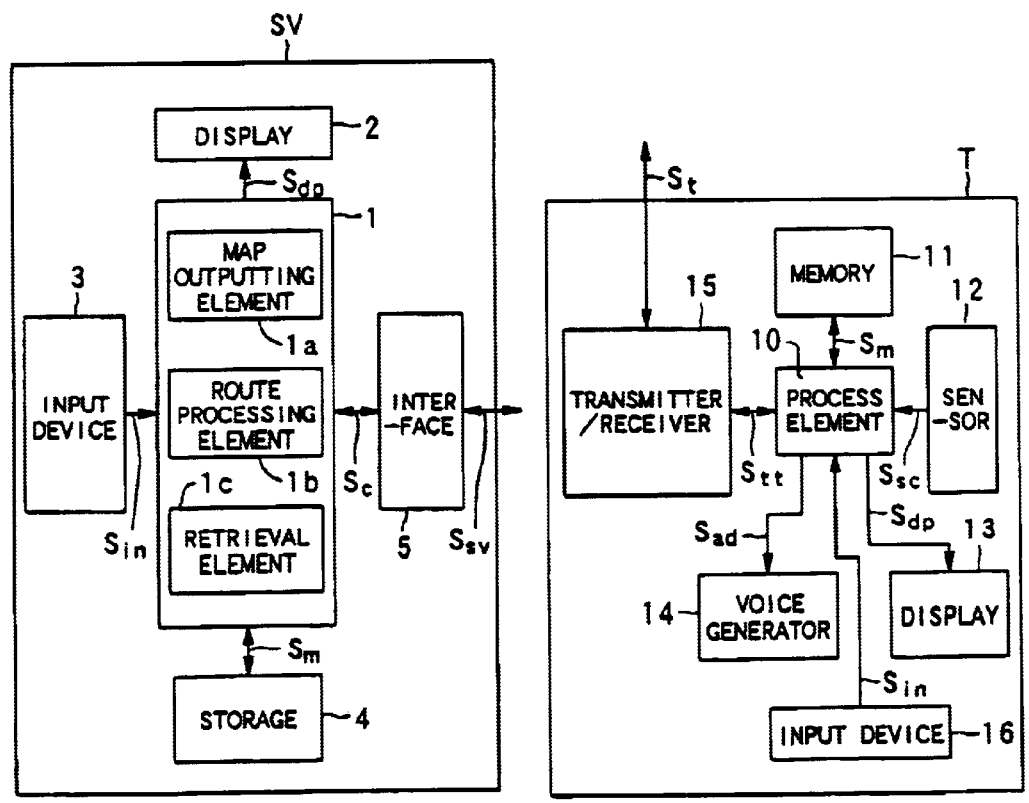
FIG. 1B details the block diagram of a server incorporated in the navigation system.
FIG. 1C details the block diagram of a terminal incorporated in the navigation terminal.
Figure 2:
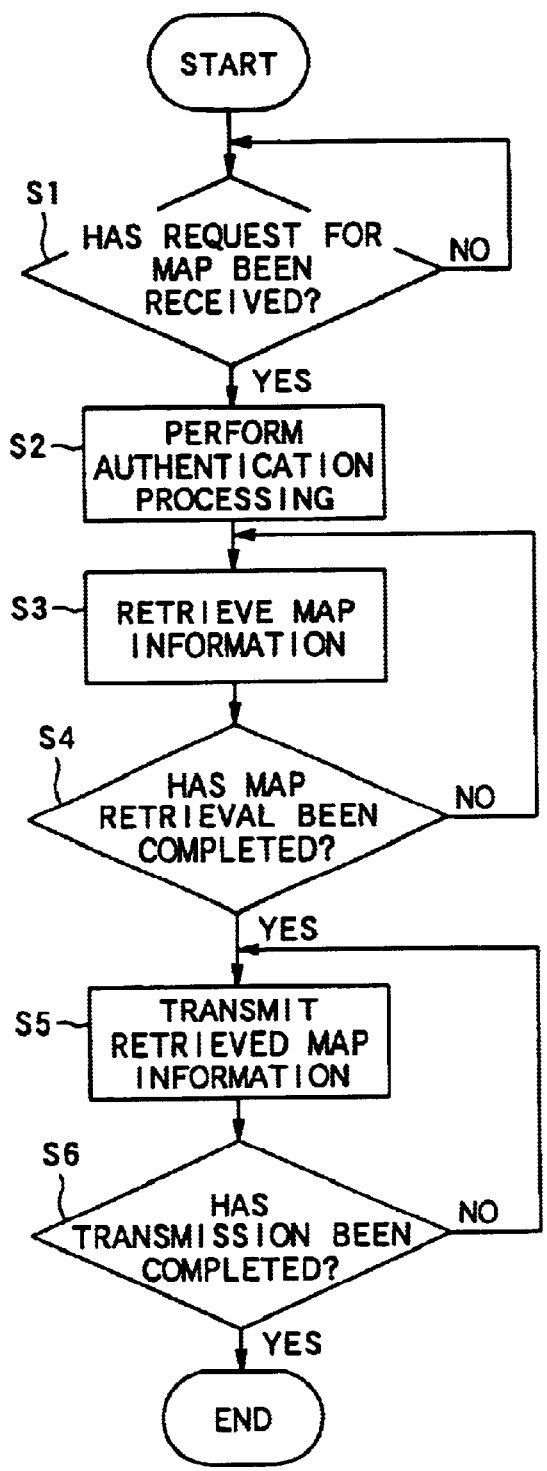
FIG. 2 is a flowchart showing processing for retrieving a map in the embodiment.
Figure 4:
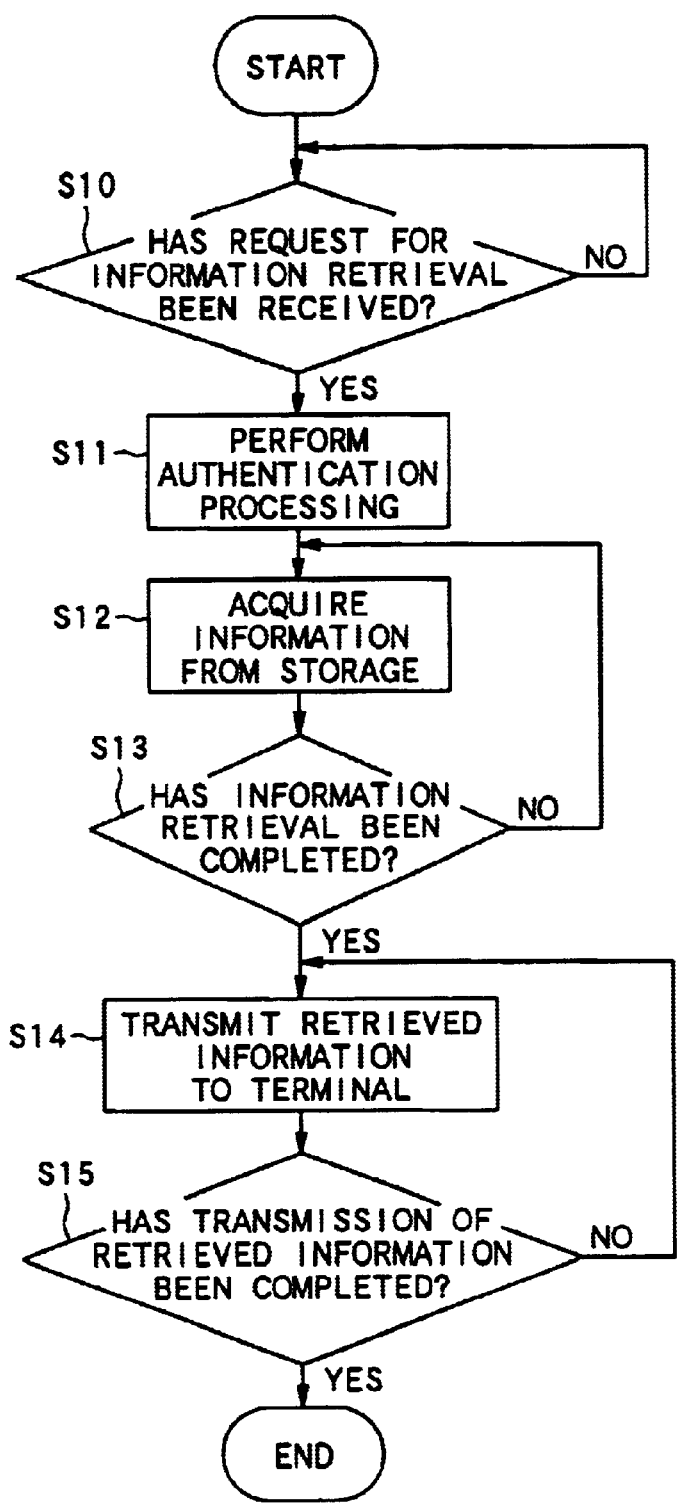
FIG. 4 shows a flowchart for information retrieval processing according to the embodiment.

FIGS. 1A to 1C show in block forms the configurations of the navigation system, while FIGS. 2 to 4 show navigation processing performed by the navigation system.

As shown in FIG. 1A, the satellite navigation system S is equipped with plural terminals T mounted on users' vehicles, the Internet IN serving as communication means, and a server SV serving as a control for the entire system.

Each terminal T is configured to send a terminal signal St through the Internet IN to the server SV and receive another terminal signal St from the server SV. The terminal signal St sent from each terminal T to the server SV includes pieces of information for requesting information concerning the current position and current driving direction of a vehicle as well as information that should be provided to a driver on the vehicle. Further, the terminal information St sent from the server SV to each terminal T is composed of various types of information necessary for navigating processing sent through the Internet IN in response to the request information.

The server SV is configured to receive, as a server signal Ssv, the terminal signal St sent from each terminal T by way of the Internet IN. Based on the server signal Ssv, the server SV performs various kinds of processing, which includes, as will be detailed later, processing to retrieve various kinds of information, such as map data, that will be presented on a certain terminal T for user's viewing and processing to retrieve a guide route for each terminal-mounted vehicle. In addition, the server SV sends out, as another server signal Ssv, results of the processing to a specified terminal T via the Internet IN. Incidentally, the server SV has the capacity of transmitting and receiving necessary information to and from a plurality of terminals T on the basis of, for example, a time sharing technique.

The server SV and each terminal T will now be detailed in terms of their configurations.

As shown in FIG. 1B, the server SV is equipped with a CPU 1 responsible for control means, a display 2, an input device 3, a storage 4 composed of a hard disk unit and others, which serves as individual information registering means, and an interface 5.

The interface 5 is formed to perform predetermined processing as an input interface on the server signal Ssv sent through the Internet IN so that a processing server signal Sc is outputted from the interface 5 to the CPU 1. Further, the interface 5 performs predetermined processing as an output interface on the processing server signal Sc sent from the CPU 1 to each terminal T so that a server signal Ssv is provided to the terminal T via the Internet IN.

The storage 4 memorizes various type of information necessary for navigation processing executed in this embodiment. Such information includes map information to be displayed on the terminal T, a variety of kinds of information used for route processing described later, spot information required for performing navigation processing, and individual information about each user who uses the terminal T. The spot information further includes positional information in relation to spots to be indicated on a map displayed by the terminal T and content information that explains each spot. These pieces of information are outputted from this storage 4 to the CPU 1, as a memory signal Sm, when they are requested. The storage 4 constitutes individual information registering means of the present invention.

The CPU 1 is functionally composed of a map outputting element 1a, route processing element 1b, and retrieving element 1c. Of these constituents, the map outputting element 1a responds to the request information, that is, the processing server signal Sc that has been received. Practically, this element 1a retrieves all the pieces of map information stored in the storage 4 to search for map information corresponding to the request information, and reads out a searched result as a memory signal Sm. Then the element 1a provides a designated terminal T with the memory signal Sm incorporated into the processing server signal Sc through the interface 5 and the Internet IN.

In response to the processing server signal Sc that composes request information, the route processing element 1b uses the map information stored in the storage 4 so as to search for (compute) both of a route along which a vehicle runs and map information including the searched route. The element 1b reads out a retrieved result as the memory signal Sm, and then provides a designated terminal T with the memory signal Sm, which is incorporated in the processing server signal Sc, via the interface 5 and the Internet IN.

In parallel with this processing, the route processing element 1b creates route guide information needed to guide a vehicle with a specified terminal T along the retrieved route. The element 1b supplies the terminal T with the created information in the form of the processing server signal Sc by way of the interface 5 and the Internet IN.

Further, on the basis of the request signal that has been received as the processing server signal Sc, the retrieving element 1c searches for the information, including spot information, stored in the storage 4 so that a searched result is read out as the memory signal Sm. The retrieving element 1c incorporates this memory signal Sm into the processing server signal Sc, which is then provided to a designated terminal T through the interface 5 and the Internet IN.

On the other hand, the input device 3 is placed to allow an operator to input necessary information into the CPU 1. On responding to such input processing, the input device 3 generates an input signal Sin indicative of such information-inputting processing, and provides the signal Sin to the CPU 1. The CPU 1 receives the input signal Sin and performs predetermined processing specified by the input signal Sin.

When the CPU 1 carries out processing specified by the input signal Sin, information which should be given an operator who operates the server SV is produced in the server SV. Such information that has been produced is handed over to the display 2 in the form of a display signal Sdp. Thus, the display 2 executes information given by the display signal Sdp.

Each terminal T has, as shown in FIG. 1C, a processor 10 serving as processing means, which includes a CPU and memories, a memory 11, a sensor 12 serving as a measurement member, a display 13, an audio output member 14, a transmitter/receiver 15 composed of for example a portable phone, and an input device 16.

Of these constituents, the transmitter/receiver 15 is responsible for two kinds of processing. That is, when the terminal signal St is received through the Internet IN, the transmitter/receiver 15 performs predetermined input-interface processing with the terminal signal St so as to produce a processing terminal signal Stt sent to the processor 10. Further, the transmitter/receiver 15 carries out predetermined output-interface processing with a processing terminal signal Stt that has been received from the processor 10, so that the terminal signal St is sent to the server SV through the Internet IN.

The sensor 12 is provided with, by way of example, a GPS (Global Positioning System) receiver, a speed sensor, and an acceleration sensor, though not shown in FIG. 1C. The GPS receiver receives a GPS electric wave that has been sent from GPS satellites travelling along their orbits. Because the GPS electric wave contains positional information, the sensor uses the positional information to compute information indicative of an absolute position of each vehicle on which each terminal T is mounted. The absolute positional information, which is expressed by both latitude and longitude information, is then sent from the sensor to the processor 10. The speed sensor is constructed in such a manner that it computes the mileage on each vehicle and speed thereof using a speed pulse signal coming from a not-shown pulse sensor to detect the rotation of a wheel of the vehicle, and outputs the computed mileage and speed information to the processor 10. Further, the acceleration sensor detects turn angles and slants in the up-and-down direction of each vehicle so as to output information representing the running direction of each vehicle to the processor 10. Thus, the above receiving and sensing elements allow the sensor 12 to provide the processor 10 with a sensor signal Ssc that corresponds to information in relation to a current position and an attitude of each vehicle and others.

The input device 16 of each terminal T is used by a crew to specify a desired map area to be displayed on the display 13, a desired destination, and others. This specification urges the navigation system to perform navigation processing in response to the specified information, so that the input device 16 produces an input signal Sin in which the specified information is reflected, and provides it to the processor 10.

The processor 10 operates on the received signals. That is, the processor 10 generates not only, based on the sensor signal Ssc, current positional information showing the current position of each vehicle on which each terminal T is mounted but also information about a request in which the input signal Sin is reflected. These pieces of information are transmitted, as the processing terminal information Stt, to the server SV via the transmitter/receiver 15.

The processor 10 receives the processing terminal signal Stt that has been transmitted from the server SV via the Internet IN and the transmitter/receiver 15. This processing terminal signal Stt indicates results that the server SV produces based on both the request information and the current positional information. Then the processor 10 extracts map information to be displayed from the processing terminal signal Stt and provides its extracted information to the display 13 as a display signal Sdp. The map information is displayed on the display 13. The information that will be displayed on the display 13 includes, in addition to the foregoing map information, map information along a route or route information according to route guide information, which are produced by the route processing element 1b of the server SV.

Of the route guide information, information which should be informed of a driver of each vehicle by a voice massage is outputted to the voice generator 14 as a voice signal Sad.

This enables the voice generator 14 to utter a necessary voice message to guide the driver.

In addition, the map information and others which have been transmitted from the server SV, which are required to temporarily be stored, are sent from the processor 10 to the memory 11 in the form of a memory signal Sm for temporary storage therein. This memory signal Sm is read out, if required, for display or other purposes.

Referring to FIGS. 2 to 4, navigation processing carried out by the server SV of the foregoing navigation system S will now be described.

First, processing for retrieving a map (map retrieval processing) will be explained with the flowchart shown in FIG. 2. This processing is performed by the server SV in order to display a desired map on the display 13 of a designated terminal T.

When the CPU 1 starts the map retrieval processing, it is determined whether or not command information for a certain map has been received from each terminal T (step S1). If there has been no request information (No at step S1), the processing is continued with monitoring the reception of the request information. When such information has been received from a certain terminal T (Yes at step S1), the certain terminal T that has issued the request information is subjected to authentication processing which is carried out by the CPU 1 (step S2).

After the authentication processing has been completed, the CPU 1 (i.e., the retrieving element 1c) uses the received request information to retrieve map information from the storage 4. Namely, map information required by the map outputting element 1a is searched from all the pieces of map information stored by the storage 4 (steps S3, S4). When the retrieval is completed (Yes at step S4), the searched map information is transmitted to the certain terminal T through the interface 5 and the Internet IN (step S5).

During the transmission of the searched map information, it is monitored if or not all the pieces of information have been transmitted (step S6). When the monitoring shows that the transmission has not completed yet (No at step S6), the transmission is kept to continue. By contrast, when the transmission of all the pieces of necessary map information has been completed (Yes at step S6), the map retrieval processing is terminated.

Referring to FIG. 3A, route-calculating processing will now be described. This processing is prepared for calculating a route for guiding a vehicle on which the terminal T is mounted.

When this route-calculating processing is activated, the CPU 1 first checks whether or not information indicative of a request for route calculation has been received (step S20). Such request information includes a starting place, a destination place, and route conditions (for example, a preference is given to highways or a particular road is necessarily included) which are used to calculate a desired route by the CPU 1. This determination is continued until the reception of such request (No at step S20). On the other hand, in cases where such request for route calculation has been received from a certain terminal T (Yes at step S20), the certain terminal T that has issued the request is subjected to authentication processing which is carried out by the CPU 1 (step S21).

After the authentication processing, individual information about a user who owns the certain terminal T is extracted from the storage 4 (step S22). Then, based on both of various conditions, such as a destination place, included in the request information and the individual information acquired, the CPU 1 (i.e., the route processing element 1b) carries out route calculation processing in a predetermined manner (steps S23 and S24). On completing the route calculation processing (Yes at step S24), the calculated results are temporarily stored in a not-shown memory in the server SV, then the processing is ended. Another example may be configured such that the calculated results of requested route is transmitted to the certain terminal that issued the request to present it on the display 13 of the terminal T.

Referring to FIG. 3B, route-navigating processing will now be described, which is performed to guide, along the calculated route, a vehicle on which the above certain terminal T is mounted.

When this route-navigating processing is activated, the CPU 1 first checks whether or not information indicative of a request for starting a route guide has been received from the above certain terminal T (step S25). This determination is continued until the reception of such request (No at step S25). On the other hand, in cases where such request for a route guide has been received from the certain terminal T (Yes at step S25), the certain terminal T that has issued the request is subjected to authentication processing which is carried out by the CPU 1 (step S26).

After the completion of the authentication processing, individual information about a user who owns the certain terminal T is extracted from the storage 4 for confirmation (step S27). Then, in response to the request information, the CPU 1 (i.e., the route processing element 1b) carries out route-navigating processing necessary for navigation (step S28 and S29). The route-navigating processing is kept continuing until its completion is issued (step S29). Incidentally, the route-navigating processing carried out at step S28 includes processing for acquiring from the certain terminal T information indicative of the current position of the vehicle, processing for determining whether or not the current position is along the route calculated in advance, and processing for not only calculating geographical relationships between the vehicle's current position and well-known positional targets existing along a remaining part of the route along which the vehicle runs from now on but also transmitting the geographical relationships to the certain terminal T through the Internet IN for reference to the driver. The well-known positional targets are for example an intersection at which the vehicle should turn or a landmark toward which the vehicle should run.

Referring to FIG. 4, information retrieval processing carried out by each terminal T will now be described. This information retrieval processing is to retrieve information which should inform a driver on each terminal T and which relates to the navigation processing.

In this information retrieval information, first, it is checked whether or not a request for information to be informed has been transmitted from a certain terminal T (step S10). When such a request has not been received (No at step S10), the above checking process will be repeated. By contrast, in cases where it is determined that such a request has been issued from a certain terminal T (Yes at step S10), the processing is moved to authentication processing for the certain terminal T (step S11).

After completing the authentication processing, the request that has been transmitted is used by the CPU 1 (i.e., the retrieving element 1c) for retrieving necessary information form all the pieces of information stored in the storage 4 (steps S12 and S13). On completion of such information retrieval (Yes at step S13), the retrieved information is sent back to the certain terminal T through the Internet IN (step S14).

During the above transmission, it is then checked if all pieces of information to be transmitted to the certain terminal T has been transmitted or not (step S15). When there are left pieces of information to be transmitted from now on (No at step S15), the transmission processing is continued until the completion of transmission of all the pieces of information (Yes at step S15).

(II) Map data partially updateable (Configuration)

Figure 5A:
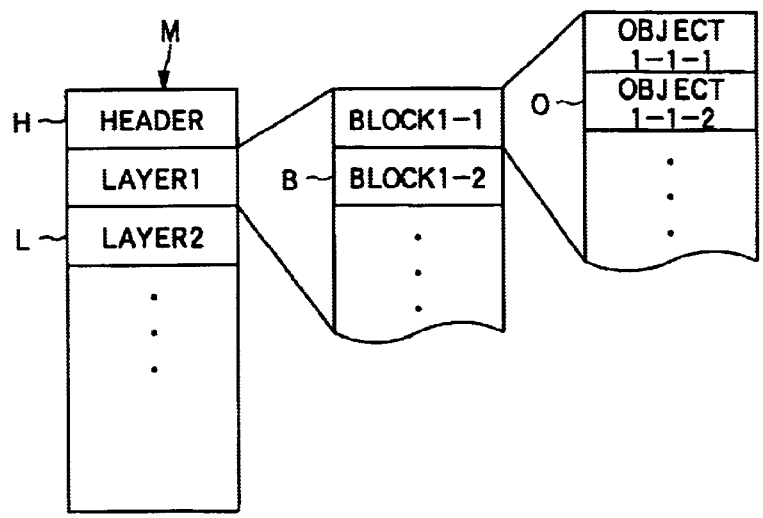
FIGS. 5A and 5B pictorially illustrates the structures of map data stored in a storage of the server.

As shown in FIG. 5A, a volume of map data M are stored in the storage 4 of the server SV. The map data M includes a group of data of layers L and data of a header H. The group of data of layers L is divided into a plurality of layers 1, 2, . . . , and each layer is further divided into a plurality of blocks B (1, 2, . . . ). Each block contains one or more objects O, thus being formed into a layered structure. That is, the first layer is composed of the layers L, the second layer is composed of the blocks B, and the third layer is composed of the objects O. For instance, as shown in FIG. 5A, the layer 1, which is one of the first layers L, is divided into plural blocks 1-1, 1-2, . . . , and one block 1-1 is further divided into plural objects 1-1-1, 1-1-2, . . . .

Figure 5B:
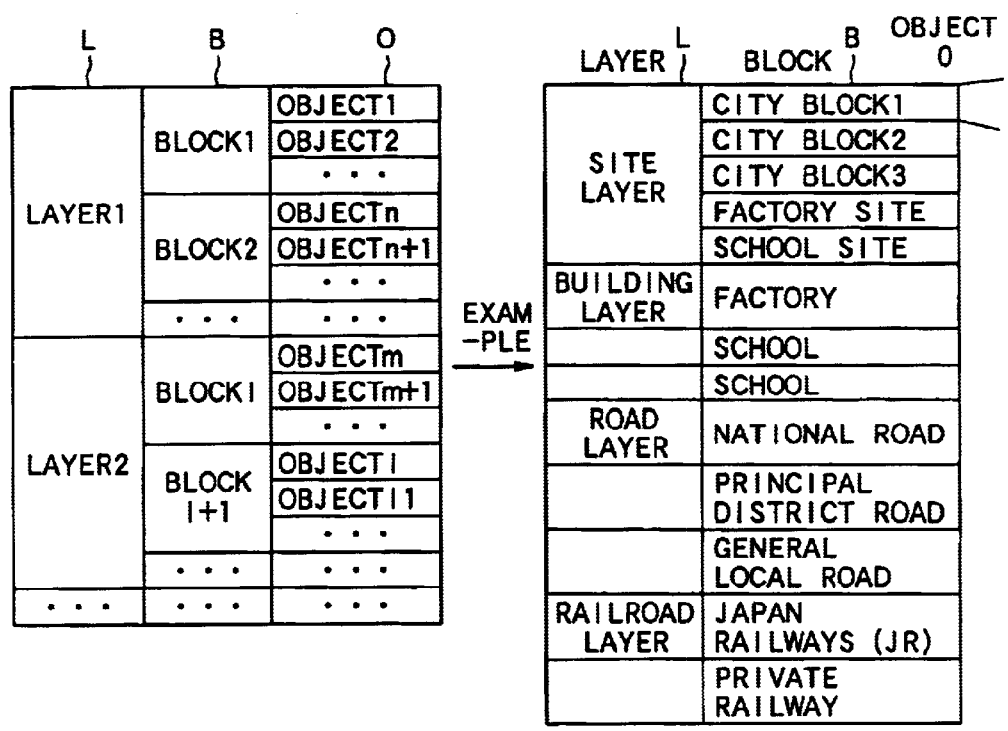

In detail, as shown in FIG. 5B, each object O represents one road, one building, or others. The same type of objects O are collected to form each block B, thus, in the case of the road, providing a national road block, a principal district road block, or others. The blocks B are layered for the type of depiction, so that the highest-concept layers B, such as a road layer or a building layer, are provided.

Each layer L is constructed into an independent structure that is irrelevant to the other layers. Similarly, each block B is constructed into an independent structure that is irrelevant to the other blocks and each object O is constructed into an independent structure that is irrelevant to the other objects. Hence, in cases where one layer L is replaced, no effect is given to the other layers. The same is true of the blocks B and objects O. It is therefore possible to replace data, layer by layer, block by block, or object by object, by manipulating data only within or toward the storage 4. Thus, the storage 4 constitutes a computer-readable recording medium according to the present invention.

The header H shown in FIG. 5A contains the version of data, the version of a format, the type of data, a train of layer information, and a train of block information.

(Operations)

Figure 6:
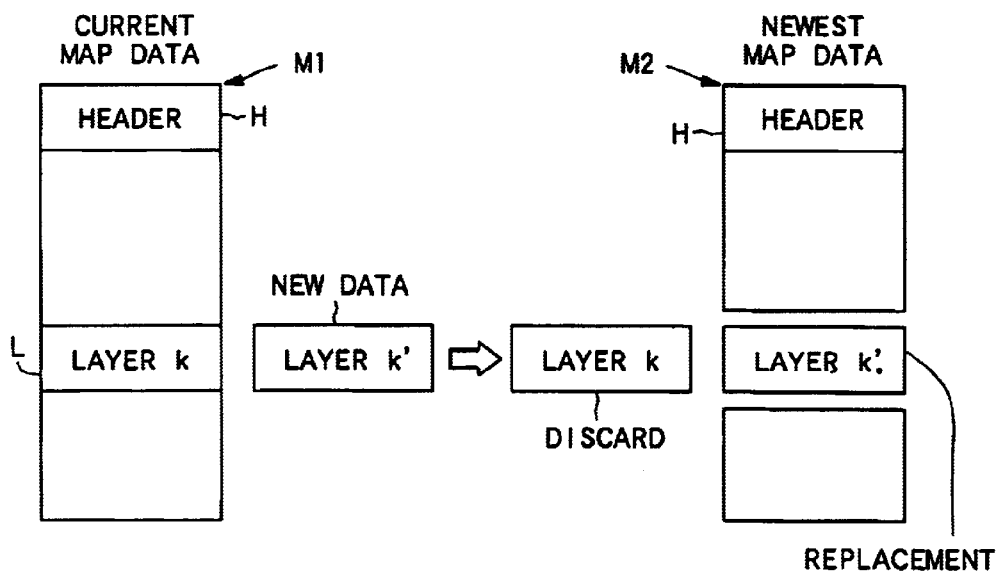
FIG. 6 pictorially illustrates a replacement of one layer using the map data shown in FIGS. 5A and 5B.

Referring to FIG. 6, a replacement of one layer will now be described.

In cases where a layer k in the current map data M1 is replaced, a new layer k' is first prepared as a new set of data, as pictorially shown in FIG. 6. The current layer k is then replaced by the new layer k', thereby providing an updated newest map data M2. The old layer k is different in a data size from the new layer k'. The replaced old data k is discarded.

Although not shown in FIG. 6, the same replacement as the above can be applied to the blocks B and the objects O, so that each block and each object can be replaced by new ones, block by block and object by object, respectively.

Figure 7:
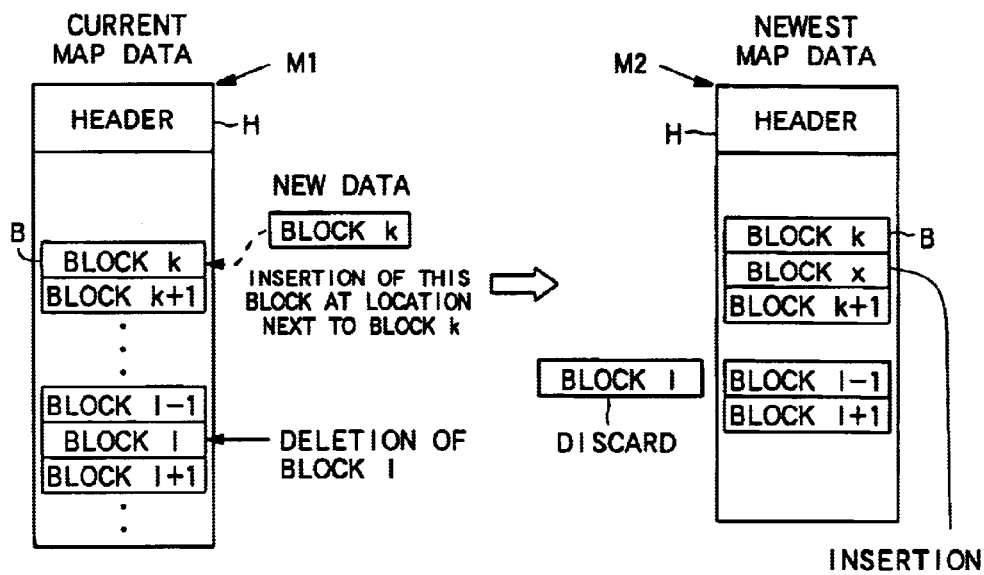
FIG. 7 pictorially illustrates a deletion and an addition of blocks using the map data shown in FIGS. 5A and 5B.

Referring to FIG. 7, a deletion and addition of a certain block will now be described.

In the case of the addition, as shown in FIG. 7, a new block x is first prepared, and then inserted into a location next to the block k in the current map data M1. In cases where a block 1 is deleted, a new block x is first prepared, the block x is inserted into a location next to the block k, and then discard the block 1 that should be deleted, thereby providing the newest updated map data M2. The above deletion and addition manners are true of the layers L and the objects O, so that the layers L and the objects O can be deleted or added every layer and every object, respectively.

In the present embodiment, when a certain layer L is deleted, it is required that all the corresponding blocks B to the certain layer L be deleted as well. When one or more layer L are added, it is needed to count the number of blocks existing in the map data so as to make information indicative of the number of layers. Additionally, when one or more blocks B are deleted or added, information indicative of the number of layers existing after the deletion or addition is renewed.

In the case that one or more objects O are deleted so as to make a certain block B vacant, layer information is renewed. Moreover, when an object O is added to the last of a certain block B, a terminator bit is updated.

When receiving a request for reloading map data from a certain terminal T, the server SV is configured to deliver to the certain terminal T only one or more sets of map data (e.g., one or more layers) that has been updated. Responsively to this delivery, the terminal T that receives the updated one or more sets of map data replace the memorized map data, set by set, according to the updated one or more sets.

(Advantages)

As a result, there are various advantages in the satellite navigation system of the present embodiment. First, in the server SV, the entire map data can be updated by replacing, adding, or deleting map data, every layer, every block, or every object, that is, in a partial updating manner. In other words, only the data that has underwent the various kinds of changes can be updated. Thus, an amount of data that should be processed for updating in the server is reduced remarkably, leading to faster updating operations and a lower cost of updating.

Secondly, the above partially replaceable configuration in the server SV is also effective in reloading map data from the server SV to each terminal T. For reloading the map data, it is sufficient that only one or more sets of map data that has been updated are delivered from the server SV to the terminal T. Hence an amount of map data to be downloaded can be reduced greatly.

Thirdly, because the map data are divided into a plurality of sets independent of each other, each certain set of map data can be replaceable with no affection for the other sets of map data in terms of data connections.

Furthermore, each block is composed of object data of the same type of attribute. Thus, the map data that contain such blocks makes it easier partial updating operations.

The present invention is not limited to the above embodiment, but may be modified into various other forms. For example, the Internet IN adopted as the communication means in the above embodiment can be replaced by a communication network that uses a leased line or a public line.

Moreover, the terminal T can be composed of, other than the satellite navigation terminal like in the foregoing embodiment, a PDA (personal digital assistants), mobile phone, universal personal computer, various types of mobile terminals with communication interfaces, or home electronic devices with communication interfaces.

The present invention may be embodied in other specific forms without departing from the spirit or essential characteristics thereof. The above embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2001-232553 filed on Jul. 31, 2001 including the specification, claims, drawings and summary is incorporated herein by reference in its entirety.

What is claimed is:

1. A method of updating map data in a server of a satellite navigation system comprising a server storing map data to be displayed on a terminal, the method comprising:

producing the map data divided into a plurality of sets of map data that are mutually-independent set by set, the divided map data being stored in the server; and updating the sets of map data stored in the server, wherein the updating is one process selected from a group of processes including adding a new set of map data to the map data, deleting a certain set of map data from the plurality of sets of map data, and replacing a certain set of map data of the plurality of sets of map data with a new set of map data.

2. The updating method of claim 1, wherein the map data consists of different kinds of map data formed into a layered structure of map data.

3. The updating method of claim 2, wherein the layered structure of map data includes a first layer formed by data of a plurality of objects, a second layer formed by a plurality of blocks, each block consisting of one or more objects of the same kind, and a third layer formed by a plurality of layers, each layer consisting of data of a plurality of blocks for the same type of depiction of map data.

4. The updating method of claim 3, wherein each set of the map data is composed of one of each layer of map data, each block of map data, and each object of map data.

5. A server for storing map data to be displayed on a terminal, both of the server and the terminal being incorporated in a satellite navigation system, the server comprising:

a storage for storing the map data divided into a plurality of sets of map data that are mutually-independent set by set, the divided map data being stored in the server; and an updating unit configured to update the sets of map data stored in the server, wherein the updating unit is configured to perform one process selected from a group of processes including adding a new set of map data to the map data, deleting a certain set of map data from the plurality of sets of map data, and replacing a certain set of map data of the plurality of sets of map data with a new set of map data.

6. The server of claim 5, wherein the map data consists of different kinds of map data formed into a layered structure of map data.

7. The server of claim 6, wherein the layered structure of map data includes a first layer formed by data of a plurality of objects, a second layer formed by a plurality of blocks, each block consisting of one or more objects of the same kind, and a third layer formed by a plurality of layers, each layer consisting of data of a plurality of blocks for the same type of depiction of map data.

8. The server of claim 7, wherein each set of the map data is composed of one of each layer of map data, each block of map data, and each object of map data.

9. A recording medium for storing map data, which is incorporated in a server of a satellite navigation system, the map data being divided into a plurality of sets of map data that are mutually-independent set by set, updateable for every set of the divided map data, and configured to have different kinds of map data formed into a layered structure of map data, wherein the map data is updated by one process selected from a group of processes including adding a new set of map data to the map data, deleting a certain set of map data from the plurality of sets of map data, and replacing a certain set of map data of the plurality of sets of map data with a new set of map data, and wherein the layered structure of map data includes a first layer formed by data of a plurality of objects, a second layer formed by a plurality of blocks, each block consisting of one or more objects of the same kind, and a third layer formed by a plurality of layers, each layer consisting of data of a plurality of blocks for the same type of depiction of map data.

* * * * *